F. R. CORNWALL.
ADDING ATTACHMENT FOR TYPE WRITING MACHINES.
APPLICATION FILED AUG. 5, 1912.

1,155,642.

Patented Oct. 5, 1915.
6 SHEETS—SHEET 1.

Witnesses:
J. Adolph Bishop
M. C. Smith

Inventor;
F. R. Cornwall

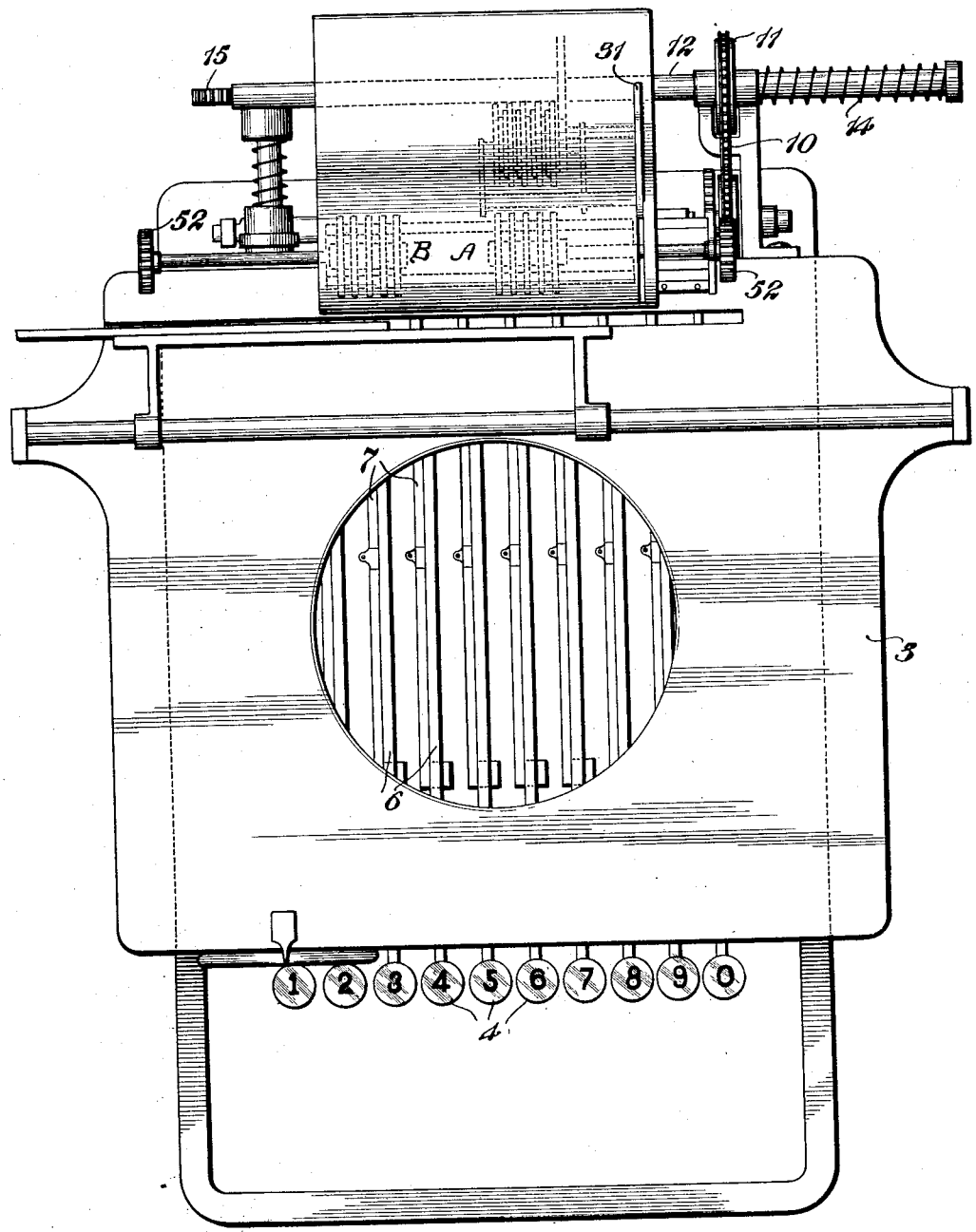

F. R. CORNWALL.
ADDING ATTACHMENT FOR TYPE WRITING MACHINES.
APPLICATION FILED AUG. 5, 1912.
1,155,642.
Patented Oct. 5, 1915.
6 SHEETS—SHEET 3.
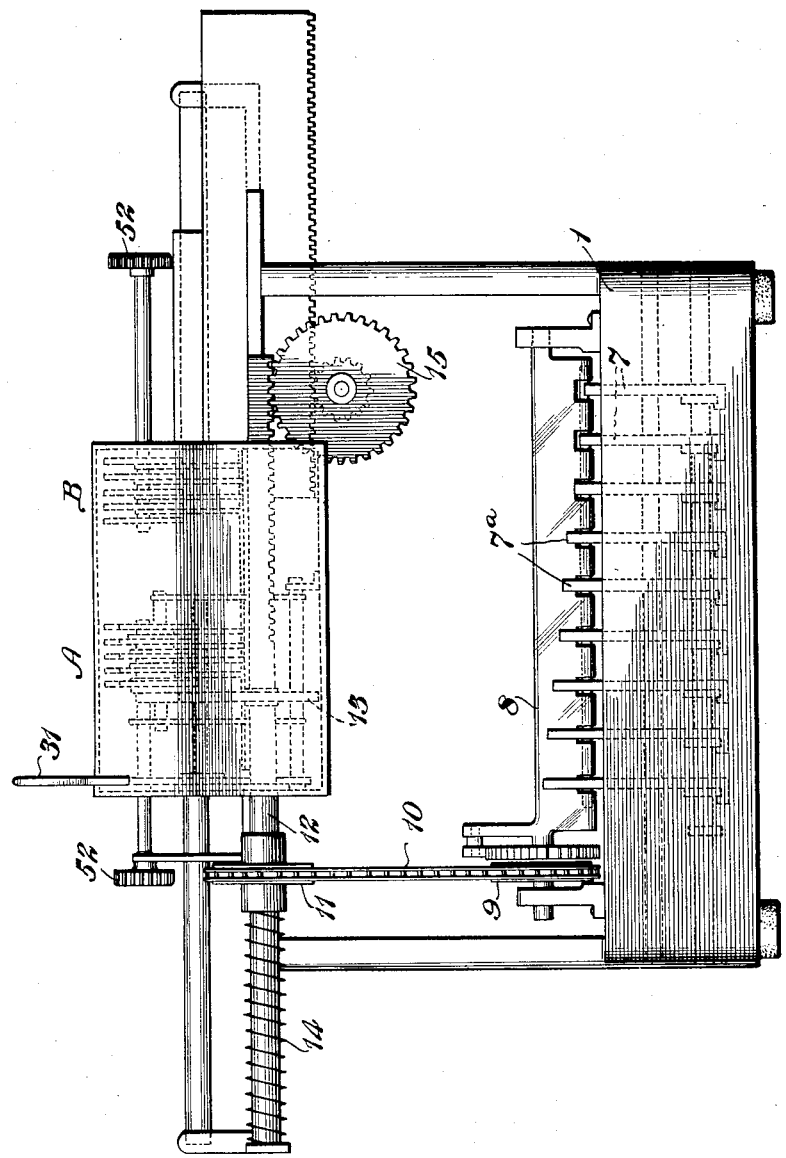
Witnesses;
J. Adolph Bishop
M. P. Smith
Inventor;
F. R. Cornwall

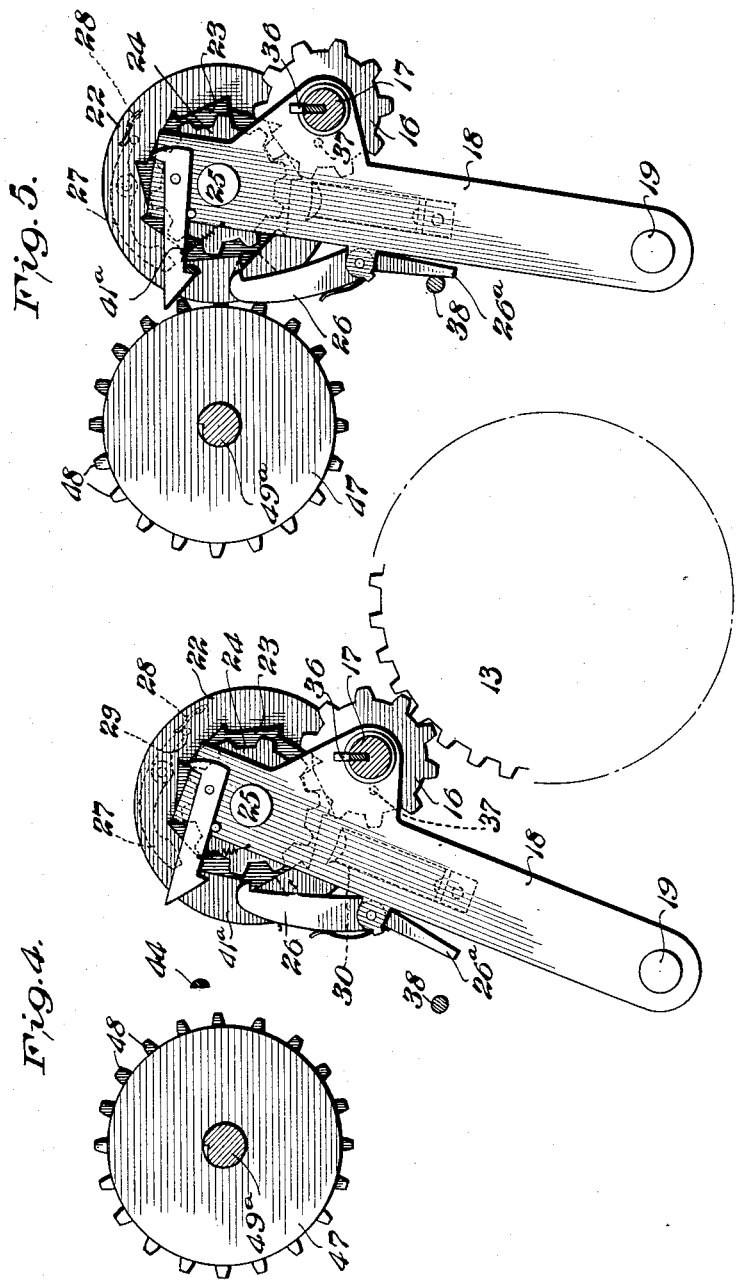

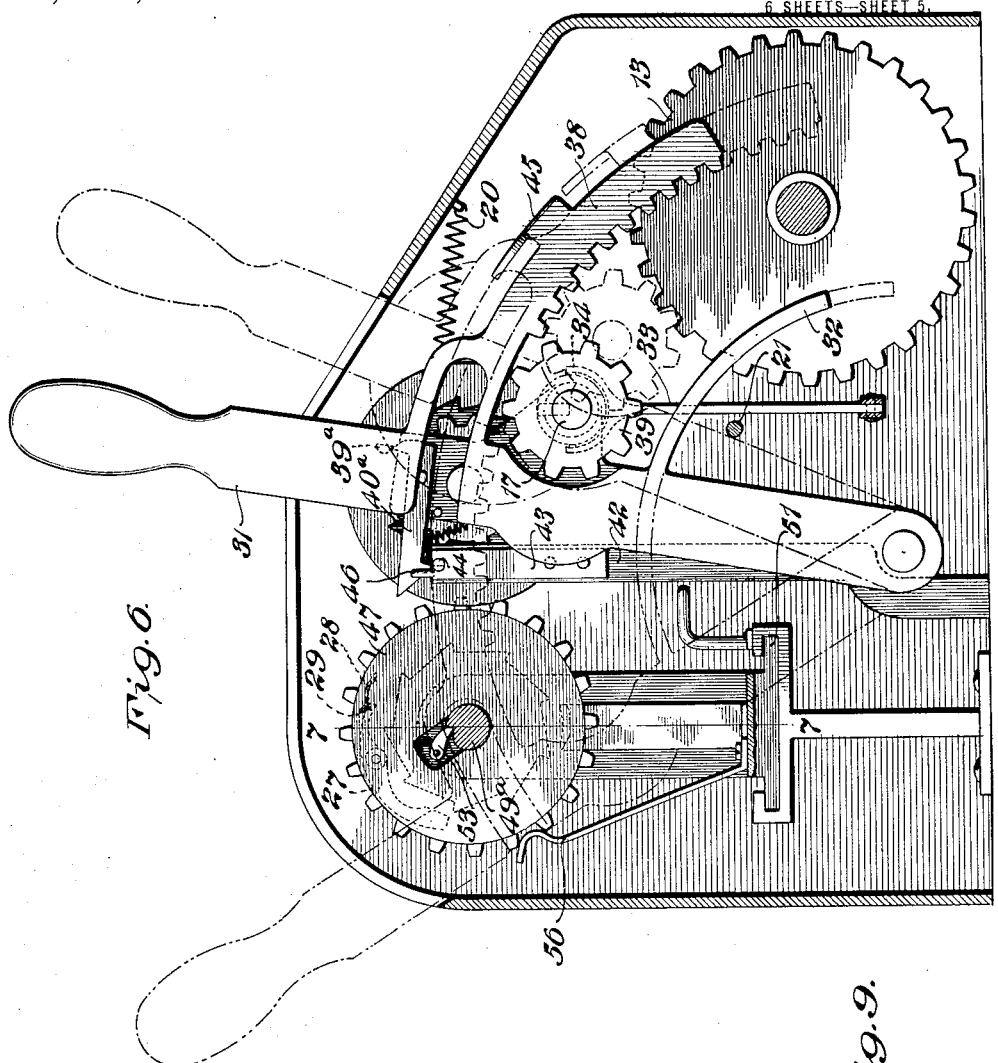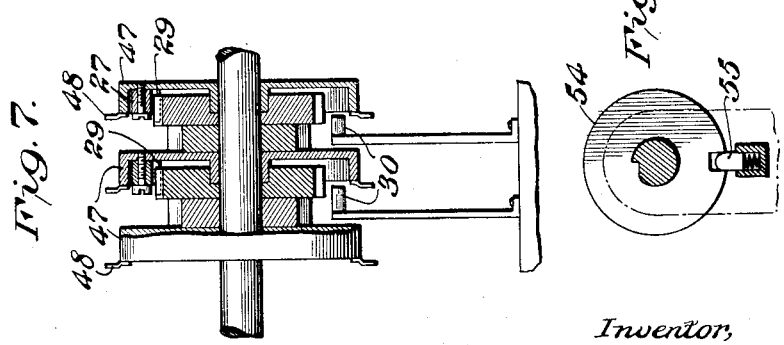

F. R. CORNWALL.
ADDING ATTACHMENT FOR TYPE WRITING MACHINES.
APPLICATION FILED AUG. 5, 1912.

1,155,642.

Patented Oct. 5, 1915.
6 SHEETS—SHEET 6.

Witnesses.
J. Adolph Bishop
M. C. Smith

Inventor,
F. R. Cornwall

UNITED STATES PATENT OFFICE.

FREDERICK R. CORNWALL, OF ST. LOUIS, MISSOURI.

ADDING ATTACHMENT FOR TYPE-WRITING MACHINES.

1,155,642.  Specification of Letters Patent.  Patented Oct. 5, 1915.

Application filed August 5, 1912. Serial No. 713,322.

*To all whom it may concern:*

Be it known that I, FREDERICK R. CORNWALL, a citizen of the United States, residing, at St. Louis, Missouri, have invented a certain new and useful Improvement in Adding Attachments for Type-Writing Machines, of which the following is a full, clear, and exact description, such as will enable others skilled in the art to which it appertains to make and use the same, reference being had to the accompanying drawings, forming part of this specification, in which—

Figure 1:
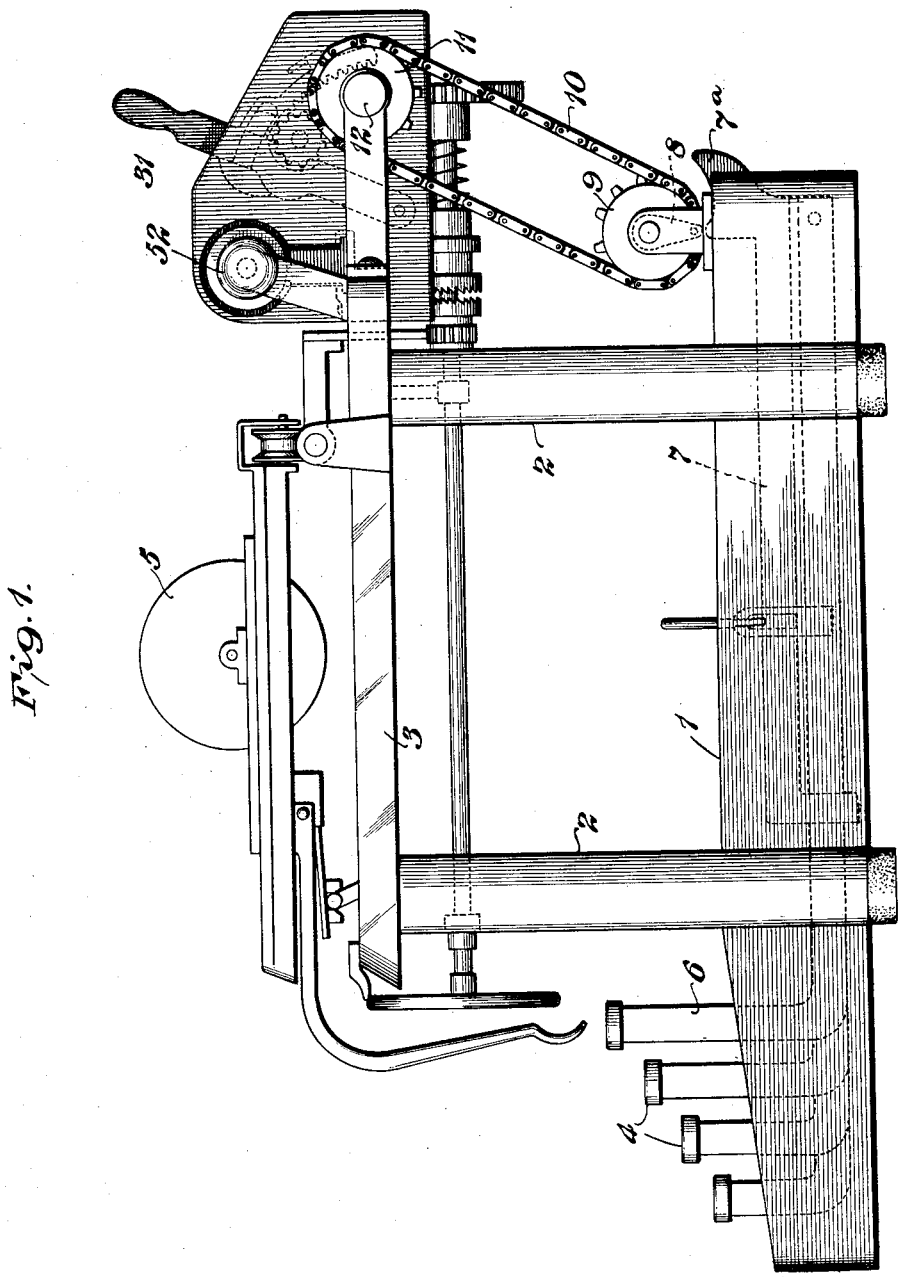
Figure 8:
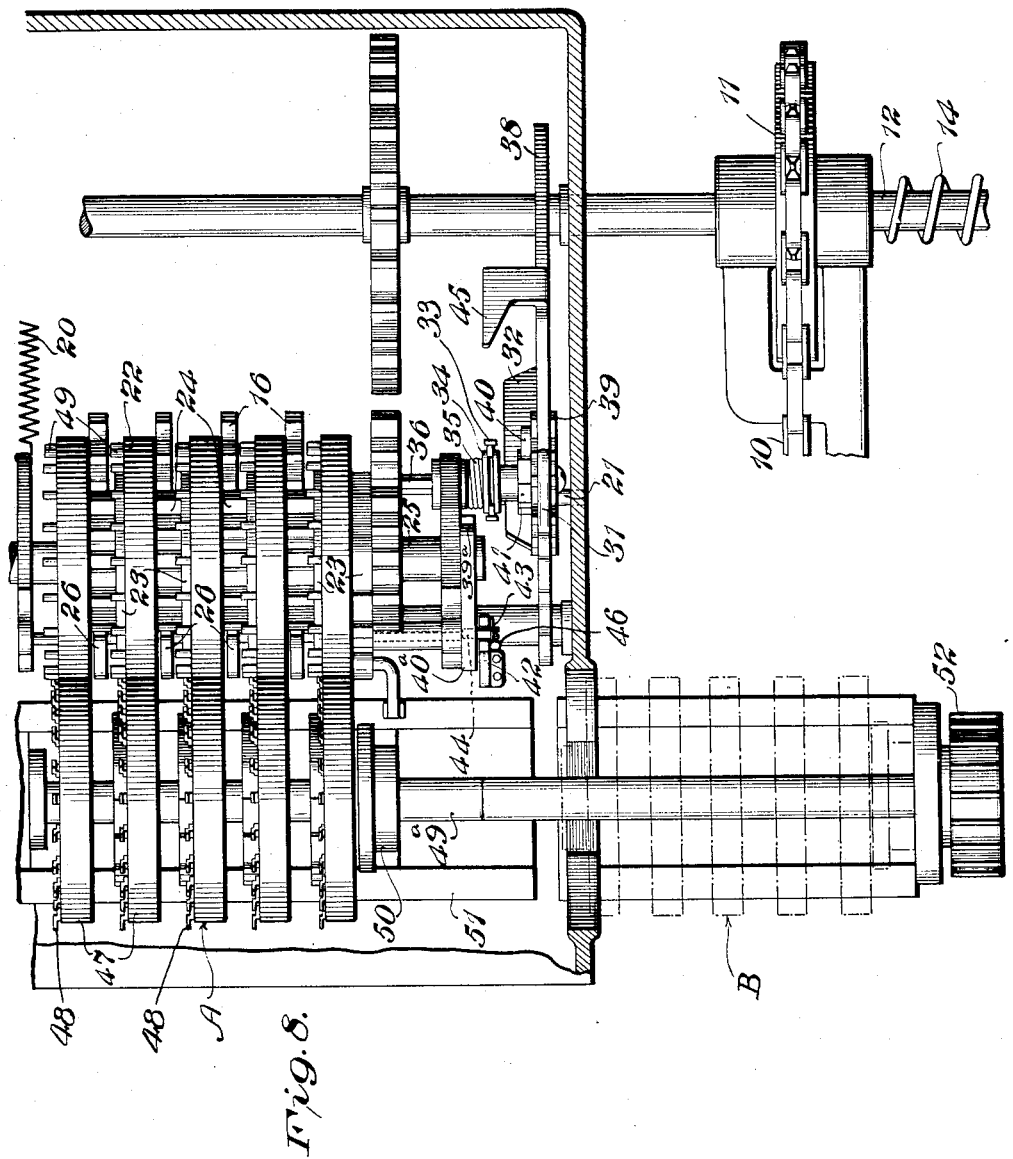

Figure 1 is a side elevational view of my improved adding attachment for typewriting machines. Fig. 2 is a top plan view of the same. Fig. 3 is a rear elevational view. Fig. 4 is a longitudinal sectional view showing the sub-totalizer in position to have items registered therein. Fig. 5 is a similar view, showing the sub-totalizer in position to transfer a sub-total into one of the grand totalizers. Fig. 6 is a side elevational view, partly in section, showing the means for effecting engagement between the sub-totalizer and one of the grand totalizers. Fig. 7 is a sectional view on the line 7—7 of Fig. 6. Fig. 8 is a top plan view. Fig. 9 is a detailed sectional view showing the registering means for the sub-totalizer.

This invention relates to a new and useful improvement in adding attachments for typewriting machines, the object being to obtain a sub-total by successive registrations in a sub-totalizer from the numeral keys of the typewriting mechanism, and to transfer said sub-total into one of a plurality of grand totalizers, whereby the separate grand totals may be indicated to represent different classes of goods or different columns of figures.

In the drawings, I have shown my improvement as applied to the adding attachment to typewriting machines disclosed in the patent to Alvan McCauley, No. 587,042, dated July 27th, 1897, but it is obvious that my improvement is applicable to various forms of typewriters and may be adapted for use in connection with different types of adding attachments to typewriting machines.

In the drawings, 1 indicates the base frame of a typewriting machine, 2, the side posts, and 3, the top plate.

4 indicates the keys of the typewriting mechanism which operate the type bars and make a printing impression upon a sheet of paper supported by the platen 5 in a well known manner.

The numeral key bars 6 coöperate with levers 7 whose rear ends are provided with cam faces 7ª, operating upon a swinging member 8 pivotally mounted on a shaft carrying a sprocket wheel 9, whereby said sprocket wheel is caused to rotate a portion of a revolution equal to the value of the numeral key depressed. A chain 10 passes under this sprocket wheel and over the sprocket wheel 11 mounted on a shaft 12, so that the motion imparted to the sprocket wheel 9 is communicated through the mechanism just described to a master wheel 13. This master wheel is fixed upon the shaft 12 and the shaft 12 is grooved so as to have a longitudinal movement with respect to the sprocket wheel 11. A spring 14 surrounding the shaft 12, tends at all times to restore the master wheel to its position in operative relation to the units wheel of the sub-totalizer wheel. The escapement mechanism of the carriage is geared to said shaft 12 by means of a gear 15 coöperating with teeth on the under side of said shaft to permit the master wheel to move from higher to lower denominations, all as described in said McCauley patent. As the master wheel is successively brought in control of the sub-totalizer wheels, the operation of the numeral keys will operate said sub-totalizer wheel a number of teeth equal to the value of the key depressed.

Referring now to Figs. 4 and 5, it will be seen that the master wheel 13 meshes with the transmitting gears 16 which are mounted on the shaft 17 journaled in swinging frame plates 18, loosely mounted on a pivot rod 19, said frame plates being held rearwardly by means of a spring 20 which draws said frame plates against a suitable stop 21. Each of the indicating disks 22 has conjoined to it a ratchet wheel 23 and a pinion 24, all of said elements being loosely mounted on a shaft 25 journaled in the swinging frames 18. A restraining pawl 26 coöperates with each pinion 24 to prevent retrograde movement thereof. Each of the disks 22 carries a pawl 27 pivotally mounted thereon, which pawl coöperates with the ratchet wheel 23 of the next adjacent indicating disk, said pawl being normally held out of engagement with said ratchet by means of a spring 28 arranged under the tail of the pawl. 29 indicates a pin or lateral projection extending from the tail of the pawl which coöperates with a short cam track 30 in its path and when the indicating disk passes from 9 to zero, this cam track will coöperate with the pin 29 and force the carrying pawl 27 into engagement with the ratchet wheel of the next adjacent indicating disk in advance so as to operate said next adjacent disk of higher order one-tenth of a revolution to effect carrying. These cam tracks 30 are preferably mounted on a bar arranged between the swinging frames 18 and extend up between the indicating disks, as shown in Fig. 7.

So far as the above construction is concerned, it is substantially the same as that disclosed in the McCauley patent aforesaid, and parts may be operated to introduce numbers into the sub-totalizer and accumulate said numbers. When it is desired to transfer a sub-total into one of the grand totalizers, the sub-totalizer is moved into engagement with one of the grand totalizers by means of a handle 31, which handle may be pivoted on the shaft on which the frame members 18 are pivoted. The handle 31 is provided with a cam extension 32 which coöperates with a yoke lever 33, the upper bifurcated end of which engages a sliding sleeve 34 and moves the same inwardly against a spring 35. To this sleeve 34 is connected a comb plate 36, the teeth of which are designed to engage pins 37 on the transmitting pinion 16 and rotate said pinions back to zero. This method of restoring register wheels back to zero is illustrated and described in Hopkins' patent, No. 517,383, March 7, 1894, and need not, therefore, be described here in detail. The function of the cam extension 32 is to move the comb plate longitudinally so as to place the teeth thereof in control of the pins on the pinions 16, and in order to rotate the shaft 17 in the groove of which said comb plate is mounted so as to restore the pinion 16 to zero, I provide the handle 31 with a rack extension 38 engaging a pinion 39 loosely mounted on the end of the shaft 17. This pinion 39 carries a pawl 40 which coöperates with a ratchet 41 fixed to shaft 17 so that on the forward movement of the handle 31, the rack 38 will positively rotate shaft 17 one complete revolution, thereby bringing all of the pinions 16 back to zero; but the rearward movement of said handle will permit the pawl 40 to ride over the teeth of the ratchet 41, thereby leaving the pinions 16 in zero position. By referring to Fig. 6, it will be observed that the first tooth of the rack extension 38, when the handle is in normal position shown by the dot and dash lines, is some distance behind the pinion 39, the purpose of this being to permit the handle to be initially moved forward so as to slide the comb plate into controlling position with respect to the pins on the pinions 16 before the shaft 17 is rotated. On the backward movement of the handles, pinions 16 are left in their zero position and just before the handle reaches its rearmost position, the cam plate 32 passes behind the yoke lever 33 and permits the spring 35 to move the comb plate out of controlling position with respect to the pinion 16. The zero position of the pinions 16 is controlled by the pins on the tail pieces of the transferring cams, striking against the rear ends of the cam plate 30. To release the indicating wheels and permit their reverse rotation, necessary in yielding a total, the restraining pawls 26 are each provided with downward extensions 26$^a$ which are brought against a fixed rod 38, whereby said restraining pawls are lifted out of engagement with their respective ratchets just before the sub-totalizer wheels are brought into mesh with the grand totalizer wheels and conversely just after the sub-totalizer wheels are moved out of engagement with the grand totalizer wheels, the restraining pawls can engage their ratchets to hold them against accidental displacement.

The means for moving the frames 18 and their carried sub-totalizer wheels into engagement with the grand totalizer wheels consists of a pin 39$^a$ on the handle 31 which normally lies behind the hooked end of a lever 40$^a$ whose forward end is provided with an inclined cam face. A spring 41$^a$ tends to hold the rear end of the lever up in front of the pin 39$^a$.

42 indicates a post to the upper end of which is secured a yielding plate 43 carrying a pin 44 normally lying in the path of the front cammed end of the lever 40$^a$.

The lever 40$^a$ is pivotally mounted on the upper end of the swinging frame plate 18 and when the handle 31 is pulled forwardly, the pin 39$^a$ engaging the rear end of the lever 40$^a$ will move the frame plate forwardly with said lever until the sub-totalizer wheels are about to mesh with the grand totalizer wheels when the upper end of the lever 40$^a$ will be lifted by the pin 44 incident to the shoulder back of the cam face of said lever dropping in front of said pin and the lower hooked end of said lever will consequently be depressed under the pin 39$^a$. In this manner, the frame 18 with its sub-totalizer wheels is connected to the handle 31 during part of the forward movement of said handle and when the sub-totalizer wheels are meshed with the grand totalizer wheels, the double hooked lever 40$^a$ will release the handle 31 from the frame 18, and engaging the pin 44, hold the sub-totalizer wheels in mesh with the grand totalizer wheels while the rack extension 38 is rotating the shaft 17 and restoring the sub-totalizer wheels to zero. The operation of the parts is so timed that the sub-totalizer wheels are in mesh with the grand totalizer wheels before the sub-totalizer wheels are restored to zero so as to introduce the subtotal into the grand total register. The continued forward movement of the handle will rotate the sub-totalizer wheels nine-tenths of a revolution and in order to release the sub-totalizer wheels when they have been properly rotated to yield their total, I provide a cam extension 45 on the rack extension 38 which cam extension engages an upwardly projecting pin 46 on the spring plate 43 and by such engagement withdraws the pin 44 from behind the shoulder of the hooked lever 40, thus permitting the frame 18 to be moved rearwardly under the impelling action of its spring and disengage the sub-totalizer from the grand totalizer.

The grand totalizer wheels are indicated at 47, the indicating disks of which are preferably provided with teeth 48 which mesh with pins 49 on the indicating disks of the sub-totalizer.

The carrying mechanism of the grand totalizer wheels may be of any desired construction, but I have illustrated the transfer pawls similar to those employed in the sub-totalizer.

There are preferably two or more groups of grand totalizer wheels indicated at A and B and these are mounted on a shaft 49ª having bearings in positioned 50 extending up from a carriage 51. The shaft 49ª of each grand totalizer is preferably independently operable, each being provided with a handle 52 at its outer end whereby the same may be rotated independently. These shafts are formed with a ratchet groove which coöperates with a spring pressed pawl 53 carried by each of the grand totalizer wheels arranged thereon. This construction permits the grand totalizer wheels to be rotated in additive operations and when it is to accumulate a grand total of all the subtotals introduced thereinto, the shaft 49ª is held against rotation by means of a disk 54 whose periphery is notched to receive a spring pressed pin 55. This disk is held close to the adjacent post by a projection on the pin and prevented from longitudinal movement with the shaft, said disk having a tooth fitting into the ratchet groove of the shaft so that when the shaft is rotated by the handle, the disk will likewise be rotated, forcing the pin 55 downwardly so that said pin will ride on the periphery of the disk until the disk makes one complete revolution and the pin drops into the notch which will indicate to the operator the zero position of the grand totalizer wheels. This is a well known restoring means for grand totalizer wheels and further description is believed to be unnecessary. Springs 56 extend up from the carriage 51 to engage the teeth of the grand totalizer indicators so as to exercise slight restraint thereon and prevent accidental displacement of said totalizers. In operation, the said totalizer wheels are operated from the keys of the typewriter to add numbers together as struck upon the keys of the typewriting mechanism and when it is desired to introduce a sub-total so obtained into one of the grand totalizers, the carriage 51 is shifted manually until either the group of wheels A or B, as desired, are properly positioned to be engaged by the sub-totalizer wheels. A notch in the carriage 51 and spring pressed pin, not shown, may be employed to hold the carriage in its adjusted position against accidental displacement. The operator now pulls the handle 31 forward, the first movement thereof placing the subtotalizer wheels under control of the comb plate. The continued forward movement of the handle will lock the totalizer wheels in mesh with the grand totalizer wheels through the medium of the hooked lever 40. The continued forward movement of the operating handle will reversely rotate the sub-totalizer wheels so as to transfer the sub-total into the grand totalizer wheels, and when the sub-totalizer wheels have been reversely rotated nine-tenths of a revolution in this transferring operation, the frame 18 is released and permitted to swing back to its normal position, its sub-totalizer wheels standing clear or at zero. A number of sub-totals may be thus obtained and transferred into either set of grand totalizer wheels as desired. When either group A or B of the grand totalizer wheels are to be cleared, the handles of their respective shafts are rotated in a direction contrary to the clockwise movement.

What I claim is:

1. In an adding attachment for type-writing machines, a sub-totalizer including totalizer wheels, means for accumulating amounts in said sub-totalizer, a grand totalizer, and a lever operable to place said sub-totalizer into coöperation with said grand totalizer and to reversely rotate the wheels thereof to restore same to zero position and introduce the amount accumulated therein into the grand totalizer.

2. In a device of the class described, a sub-totalizer, means for introducing amounts into said sub-totalizer, a grand totalizer, an operating handle, means operated from said handle for moving said subtotalizer into coöperation with said grand totalizer, means for locking said sub-totalizer in coöperation with said grand totalizer, means operated from said handle for transferring the amount accumulated in said sub-totalizer into said grand totalizer, and means for unlocking said sub-totalizer to permit its return to normal position.

3. In a device of the class described, the combination of a sub-totalizer including totalizer wheels and means for rotating the same to introduce amounts thereinto, a grand totalizer, an operating handle, and means operable by said handle for freeing said totalizer wheels from their operating means and rotating them to introduce amounts accumulated therein into the grand totalizer.

4. In a device of the class described, in combination, a sub-totalizer including totalizer wheels and actuating wheels, means for introducing amounts into said sub-totalizer, a grand totalizer, an actuating handle for throwing said sub-totalizer and said grand totalizer into coöperation, and a rack operable by said handle adapted to rotate the actuating wheels of the sub-totalizer to introduce the amount accumulated in the sub-totalizer into the grand totalizer.

5. In a device of the class described, in combination, a sub-totalizer including totalizer wheels and actuating wheels for said totalizer wheels, means for operating said actuator wheels to introduce numbers into said sub-totalizer, a grand totalizer, means for placing said sub-totalizer and said grand totalizer in coöperation, an operating handle, and means operated thereby adapted to engage the actuator wheels and operate them to transfer an amount accumulated in said sub-totalizer into said grand totalizer.

6. In a device of the class described, the combination of a sub-totalizer including actuating wheels, means for operating said actuating wheels to introduce amounts into said sub-totalizer, a grand totalizer, an operating handle adapted to place said sub-totalizer and said grand totalizer in coöperative relationship, a shaft adapted to be rotated by said operating handle, and means operated by said operating handle for locking said actuating wheels to said shaft.

7. In a device of the class described, the combination of a sub-totalizer including totalizer wheels and actuator wheels for rotating said totalizer wheels, a grand totalizer, means for rotating said actuator wheels to rotate said totalizer wheels to introduce amounts thereinto, means operated thereby for moving said sub-totalizer into engagement with said grand totalizer, a shaft adapted to be rotated by said operating handle so as to rotate said actuator wheels to introduce the amounts accumulated therein into said grand totalizer, and means operated by said actuating handle for locking said actuator wheels to said shaft.

8. In a calculating machine, the combination with a total register and a master means, of an item register interposed between the total register and the master means and including a series of denominational members arranged to be operated one at a time by the master means, said item register being movable away from the operative plane of the master means and into operative relation with the total register.

In testimony whereof I hereunto affix my signature in the presence of two witnesses, this 3rd day of August, 1912.

F. R. CORNWALL.

Witnesses:
M. P. SMITH,
M. A. HANDEL.